US008914896B2

(12) United States Patent
Richter et al.

(10) Patent No.: US 8,914,896 B2
(45) Date of Patent: *Dec. 16, 2014

(54) SECURE DATA STORAGE AND RETRIEVAL

(71) Applicant: Lockheed Martin Corporation, Bethesda, MD (US)

(72) Inventors: Walter S. Richter, Newark Valley, NY (US); Daniel J. Moch, Endicott, NY (US); Ricky R. Martin, Owego, NY (US); Michael Hochdoerfer, Vestal, NY (US); Max Smirnoff, Endicott, NY (US); Thomas J. Hanley, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/974,447

(22) Filed: Aug. 23, 2013

(65) Prior Publication Data

US 2013/0347120 A1   Dec. 26, 2013

Related U.S. Application Data

(63) Continuation of application No. 13/351,975, filed on Jan. 17, 2012, now Pat. No. 8,539,601.

(51) Int. Cl.
| | |
|---|---|
| *G06F 7/04* | (2006.01) |
| *G06F 21/60* | (2013.01) |
| *G06F 21/76* | (2013.01) |
| *G06F 21/78* | (2013.01) |
| *G06F 17/30* | (2006.01) |

(52) U.S. Cl.
CPC .......... *G06F 21/60* (2013.01); *G06F 17/30091* (2013.01); *G06F 2221/2107* (2013.01); *G06F 21/76* (2013.01); *G06F 21/78* (2013.01)
USPC ........................................................ 726/26

(58) Field of Classification Search
USPC .............. 726/26; 713/164, 193; 380/262, 268
See application file for complete search history.

(56) References Cited

U.S. PATENT DOCUMENTS

| | | | |
|---|---|---|---|
| 5,058,164 A | 10/1991 | Elmer et al. | |
| 5,590,365 A | 12/1996 | Ide et al. | |
| 6,571,365 B1 | 5/2003 | Rhodes et al. | |
| 6,668,325 B1 | 12/2003 | Collberg et al. | |
| 7,133,522 B2 | 11/2006 | Lambert | |
| 7,464,255 B1 | 12/2008 | Tan et al. | |
| 7,941,667 B2 | 5/2011 | Miyazaki et al. | |
| 8,014,526 B2 | 9/2011 | Billhartz et al. | |
| 2003/0070083 A1 | 4/2003 | Nessler | |
| 2006/0126833 A1 | 6/2006 | O'Leary et al. | |
| 2009/0202067 A1 | 8/2009 | Michaels et al. | |
| 2010/0054461 A1 | 3/2010 | Ciet et al. | |
| 2010/0306854 A1 | 12/2010 | Neergaard | |
| 2011/0116624 A1 | 5/2011 | Farrugia et al. | |

*Primary Examiner* — Beemnet Dada
(74) *Attorney, Agent, or Firm* — Miles & Stockbridge PC; James T. Carmichael

(57) ABSTRACT

A system for secure data processing can include an electronic data storage device and a field programmable gate array coupled to the electronic data storage device. The field programmable gate array can be configured to include a data storage section for performing a data storage operation and a data retrieval section for performing a data retrieval operation. The data storage operation can include obtaining a seed value and retrieving one or more algebraic operations based on the seed value. The storage operation can also include processing input data according to the one or more algebraic operations to generate pseudorandom output data, prepending the seed value to the output data and storing the output data in the electronic data storage device.

10 Claims, 5 Drawing Sheets

SECURE DATA STORAGE AND RETRIEVAL

Embodiments of the present invention relate generally to methods, systems and computer-readable media for data storage and retrieval, and more specifically, to methods, systems and computer readable media for secure data storage and retrieval.

When storing and retrieving constant information in a digital computer system that includes multiple layers of data protection, many systems encrypt data using a secure algorithm such as AES. Encrypting and decrypting data using a secure algorithm can be demanding on hardware and software resources. Further, in a programmable logic device, such as a field programmable gate array (FPGA), implementing the encryption/decryption can consume valuable "real estate" (e.g., logic cells and/or area on the programmable logic device), which could be used to perform other system functions.

Further, in a system already having multiple layers of data protection, secure encryption of data may be unnecessary. All that may be necessary in such instances is to provide a method or system for giving constant data the appearance of pseudorandomness when stored in a memory, while minimizing the usage of FPGA real estate, for example. The present invention was conceived in light of the above considerations, among other things.

An embodiment can include a system for secure data processing can include an electronic data storage device and a field programmable gate array coupled to the electronic data storage device. The field programmable gate array can be configured to include a data storage section for performing a data storage operation and a data retrieval section for performing a data retrieval operation. The data storage operation can include obtaining a seed value and retrieving one or more algebraic operations based on the seed value. The storage operation can also include processing input data according to the one or more algebraic operations to generate pseudorandom output data, prepending the seed value to the output data and storing the output data in the electronic data storage device. The retrieval operation can include reading a seed value appended to a section of data stored in the electronic data storage device and retrieving one or more algebraic operations based on the seed value. The retrieval can also include retrieving the section of data and processing the section of data by performing the one or more algebraic operations in reverse order on the section of data to generate a copy of the input data.

An embodiment can also include a separate data protection layer adapted to protect data being transferred to and from the system. In another embodiment the field programmable gate array further can include an arithmetic section for performing algebraic operations on data, such as the processing of the input data and the processing of the section of data.

In another embodiment, the field programmable gate array can include an algebraic operations table with algebraic operations corresponding to seed values. In yet another embodiment, the field programmable gate array can include a seed table containing seed values available for use by the field programmable gate array.

One or more embodiments can include a method for storing data including obtaining, at a programmable logic device, a seed value, and retrieving, with the programmable logic device, one or more algebraic operations based on the seed value. The method can also include processing, with the programmable logic device, input data according to the one or more algebraic operations to generate pseudorandom output data, and prepending, with the programmable logic device, the seed value to the output data. The method can further include storing the output data in an electronic data storage device coupled to the programmable logic device.

The method can also include performing the one or more algebraic operations on the input data using an arithmetic section of the programmable logic device. Further, the algebraic operation can be retrieved from an algebraic operations table having stored therein algebraic operations corresponding to seed values. Also, the seed value can be retrieved from a seed table containing seed values available for use by the programmable logic device.

One or more embodiments can include a method for retrieving data including reading, at a programmable logic device, a seed value appended to a section of data stored in an electronic data storage device coupled to the programmable logic device, and retrieving, with the programmable logic device, one or more algebraic operations based on the seed value. The method can also include retrieving, with the programmable logic device, the section of data from the electronic data storage. The method can further include processing, with the programmable logic device, the section of data by performing the one or more algebraic operations in reverse order on the section of data to generate output data.

The method can also include performing the one or more algebraic operations on the section of data using an arithmetic section of the programmable logic device. In the method, the one or more algebraic operations can be retrieved from an algebraic operations table having stored therein algebraic operations corresponding to seed values. Also, in the method, the seed value can be retrieved from a seed table containing seed values available for use by the programmable logic device.

One or more embodiments can also include a nontransitory computer readable medium having stored thereon programmable logic configuration software that, when processed by a programmable logic device, cause the programmable logic device to be configured to perform a data storage operation and a data retrieval operation.

The data storage operation can include obtaining a seed value and retrieving one or more algebraic operations based on the seed value. The data storage operation can also include processing input data according to the one or more algebraic operations to generate pseudorandom output data, and prepending the seed value to the output data. The data storage operation can further include storing the output data in the electronic data storage device.

The data retrieval operation can include reading a seed value appended to a section of data stored in the electronic data storage device, and retrieving one or more algebraic operations based on the seed value. The data retrieval operation can also include retrieving the section of data, and processing the section of data by performing the one or more algebraic operations in reverse order on the section of data to generate a copy of the input data.

The operations can further include performing algebraic operations on the input data and on the section of data using an arithmetic section of the programmable logic device. Also, the one or more algebraic operations can be retrieved from an algebraic operations table having stored therein algebraic operations corresponding to seed values.

The seed value can be retrieved from a seed table containing seed values available for use by the programmable logic device. In one or more of the embodiments above, the programmable logic device can be a field programmable gate array (FPGA) and the programmable logic configuration software can be FPGA software. Alternatively, the programmable logic device can be a complex programmable logic device (CPLD), which may benefit from an embodiment because CPLDs are typically smaller in size (number of logic cells and/or "real estate") than FPGAs, consequently conserving real estate on a CPLD may be important.

DETAILED DESCRIPTION

Figure 1:
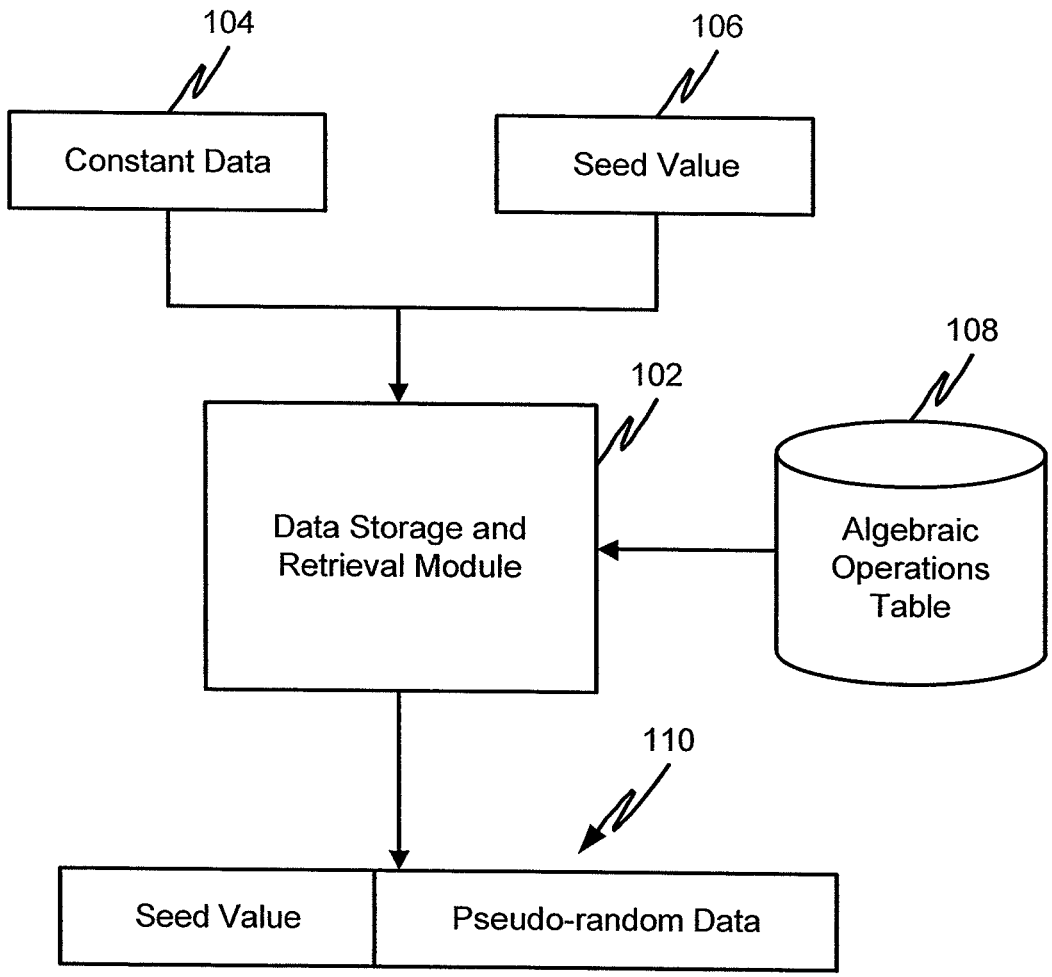
FIG. 1 is a diagram of an exemplary secure data storage/retrieval system in accordance with the present disclosure showing a data storage operation.

FIG. 1 shows a secure data storage/retrieval system 100 that includes a data storage and retrieval module 102 and an algebraic operations table 108.

In operation, the data storage and retrieval module 102 receives constant data 104 and a seed value 106. The data storage and retrieval module 102 uses the seed value to look up and retrieve one or more algebraic operations from the algebraic operations table 108.

The data storage and retrieval module 102 processes the constant data by performing the one or more algebraic operations on the constant data to produce pseudo-random data. The data storage and retrieval module 102 then prepends the seed value to the pseudo-random data and provides the combined seed value and pseudo-random data 110 as output to be stored in a memory device or transmitted to an external system or device. The seed value may be stored either along with the pseudo-random data or in a separate location, which could further increase security of the system by separating the lock (e.g., the pseudo-random data) and key (e.g., seed value).

Figure 2:
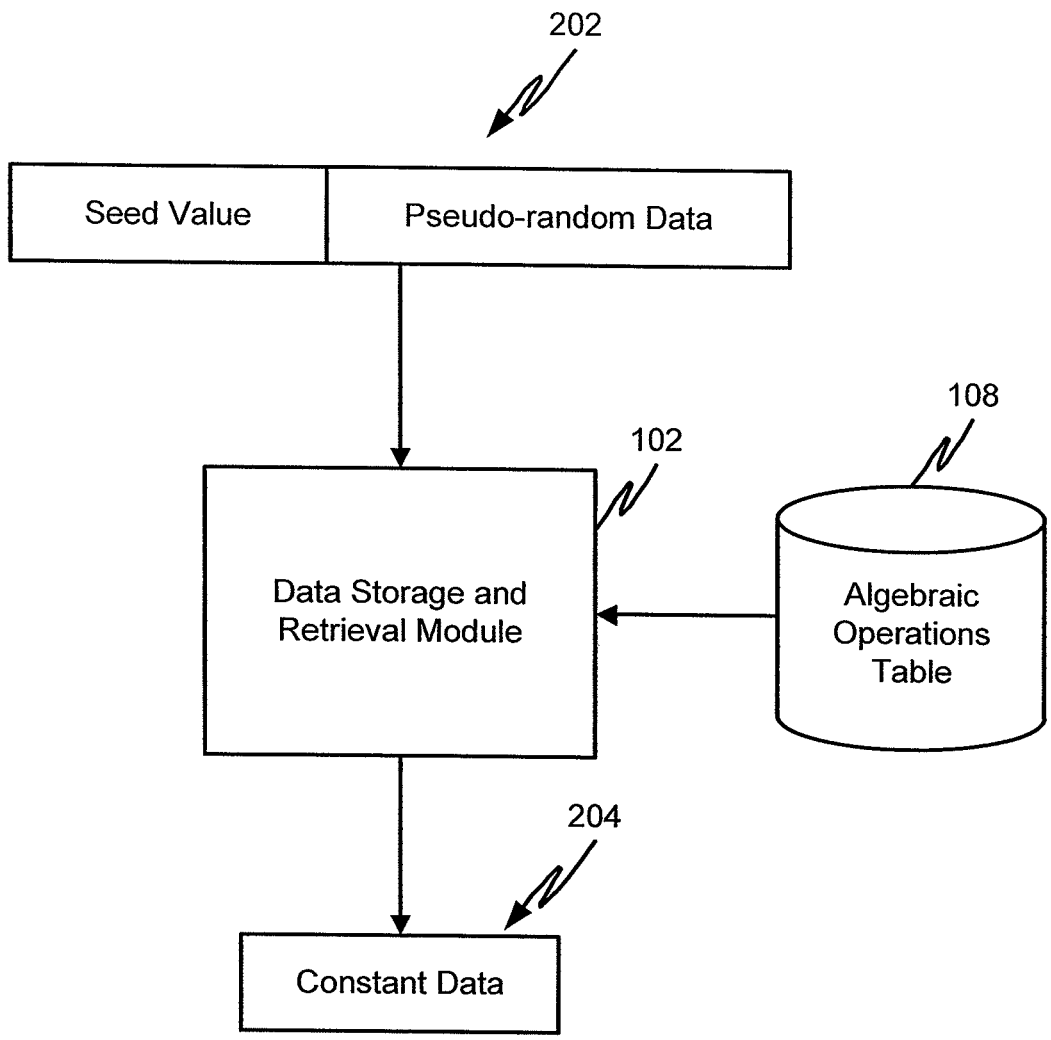
FIG. 2 is a diagram of an exemplary secure data storage/retrieval system in accordance with the present disclosure showing a data retrieval operation.

FIG. 2 shows a system 200 that includes the data storage and retrieval module 102 and the algebraic operations table 108 described above in connection with FIG. 1. The system 200 shown in FIG. 2 is performing a data retrieval operation.

In this operation, the data storage and retrieval module 102 receives (or retrieves from storage) a seed value and a section of pseudo-random data 202. Using the seed value, the data storage and retrieval module 102 retrieves one or more algebraic operations from the algebraic operations table 108.

The data storage and retrieval module 102 performs the algebraic operations in reverse order with respect to the order used to convert the constant data to pseudo-random data. Thus, transforming the pseudo-random data back into constant data 204, which can be provided as output to be stored in a memory device or transmitted to an external system or device.

Figure 3:
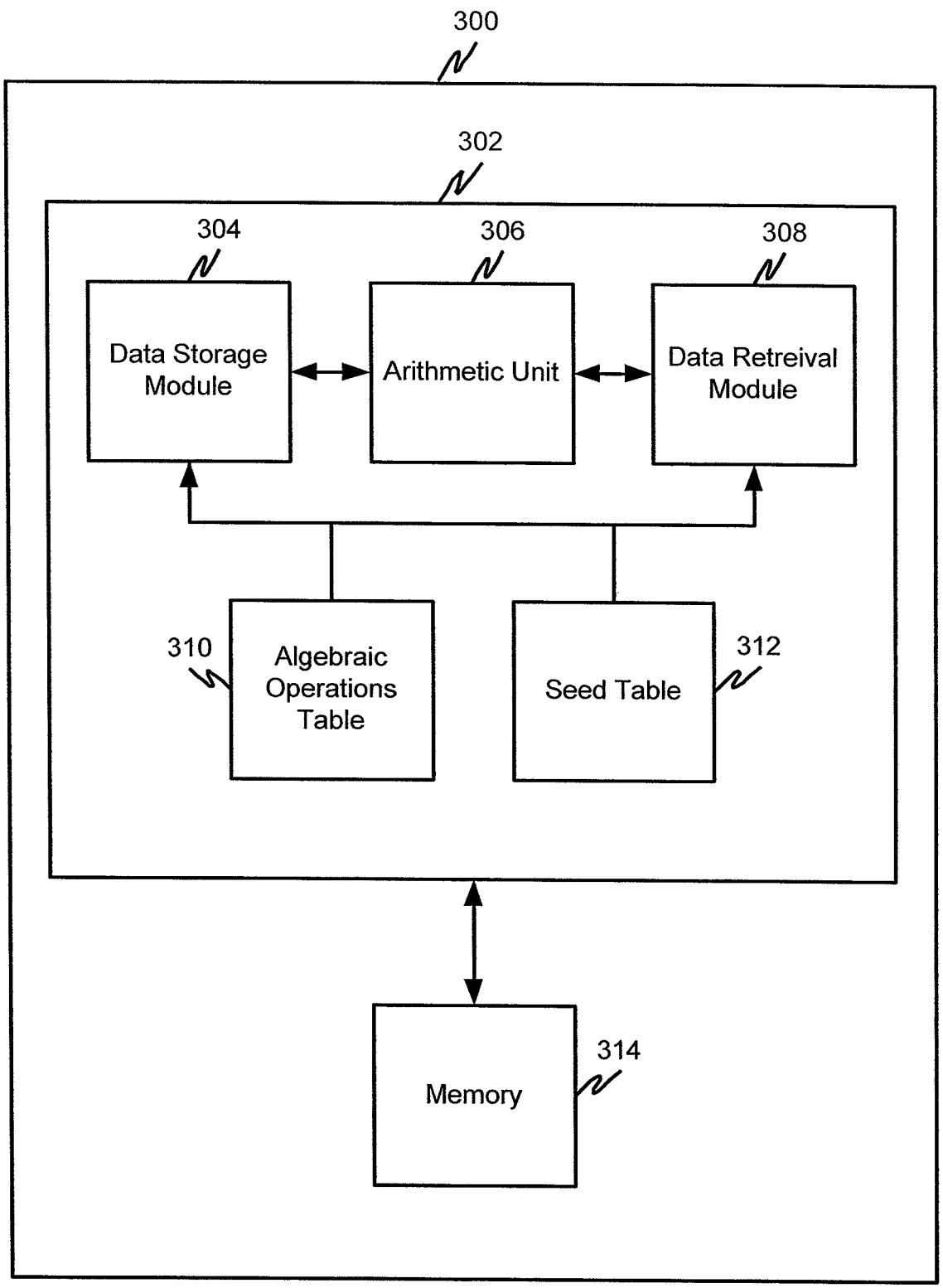
FIG. 3 is a diagram of an exemplary secure data storage/retrieval system in accordance with the present disclosure showing a programmable logic device (e.g., FPGA) implementation within a system having additional data security layers.

FIG. 3 is a diagram of an exemplary secure data storage/retrieval system 300 having a programmable logic device (e.g., CPLD, FPGA, ASIC, or the like) 302 configured to perform secure data storage and retrieval in accordance with the present disclosure.

The programmable logic device 302 includes a data storage module 304 configured to perform a data storage operation and a data retrieval module 308 configured to perform a data retrieval operation. The data storage module 304 and the data retrieval module 308 are coupled to an arithmetic unit 306 configured to perform arithmetic operations in order to carry out algebraic operations associated with the data storage and/or retrieval. It will be appreciated that the data storage module 304 and the data retrieval module 308 can be combined into a single module configured to perform both data storage and retrieval. Further, the data storage device (for storing the pseudo-random data and/or seed value) may be either external to the FPGA (or other programmable logic device) or resident in internal FPGA memory.

The programmable logic device 302 also optionally includes an algebraic operations table 310 for storing algebraic operations associate with a seed value, and a seed table 312 for storing seed values available for use by the programmable logic device 302.

A memory 314 is coupled to the programmable logic device 302 and is adapted to store data for processing by the programmable logic device 302.

Figure 4:
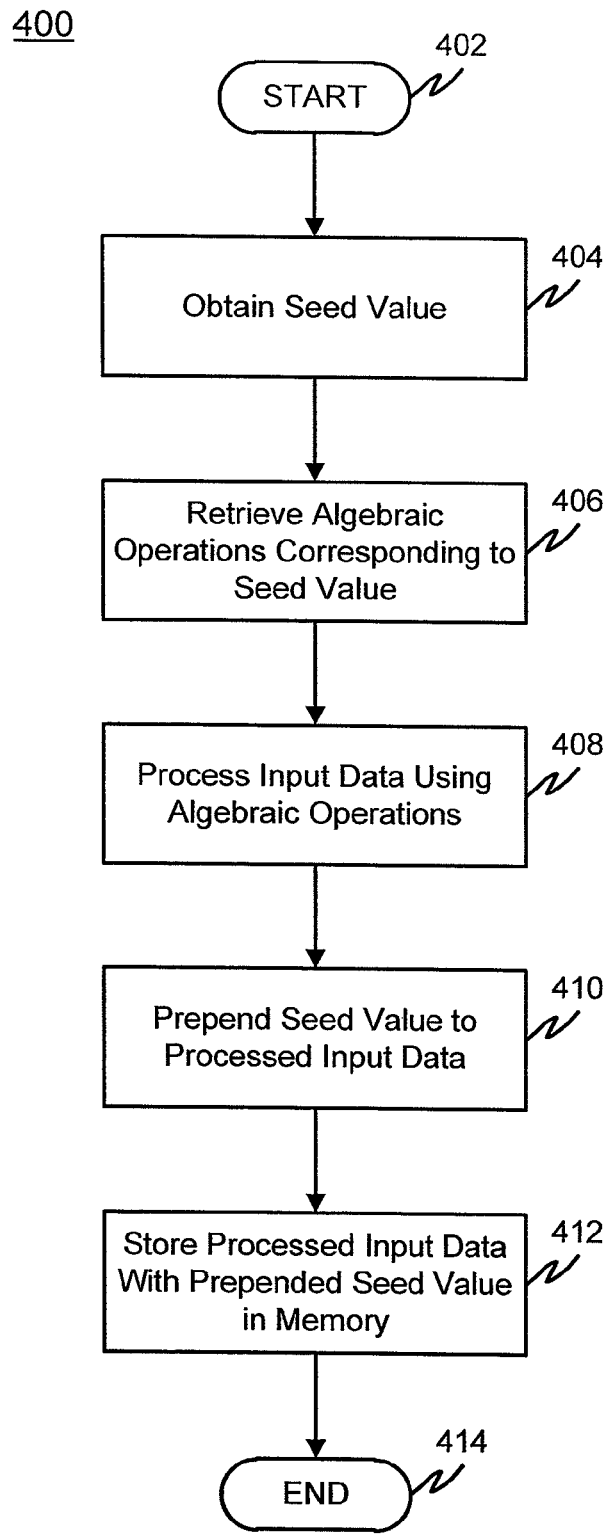
FIG. 4 is a chart of an exemplary data storage method in accordance with the present disclosure.

FIG. 4 is a chart of an exemplary data storage method 400 in accordance with the present disclosure. Processing begins at 402 and continues to 404.

At 404, a seed value is obtained. For example, a programmable logic device may obtain a seed value from an internal or external data storage device or may receive the seed value from a different system or device external to the programmable logic device. Processing continues to 406.

At 406, one or more algebraic operations are retrieved based on the seed value. For example, a programmable logic device may retrieve algebraic operations from an internal or external data storage device or may receive the seed value from a different system or device external to the programmable logic device. Processing continues to 408.

At 408, input data is processed according to the algebraic operations. For example, the programmable logic device performs the retrieved algebraic operations in a first order (e.g., forward order) on constant input data received by the programmable logic device. The constant input data is transformed into pseudo-random data. Processing continues to 410.

At 410, the seed value is prepended to the pseudo-random output data. This can be done after the input data has been processed or, in the case of a streaming data implementation, the prepending may occur initially and the seed value may be sent out, in effect, as a header with the pseudo-random data to follow. Processing continues to 412.

At 412, the combination of the seed value prepended to the pseudo-random data is stored in memory. It will be appreciated that the combined data may be transmitted to another system in addition to, or as an alternative to, storing the combined data in memory. Processing continues to 414, where processing ends.

It will be appreciated that 404-412 can be repeated in whole or in part in order to accomplish a contemplated data storage operation.

Figure 5:
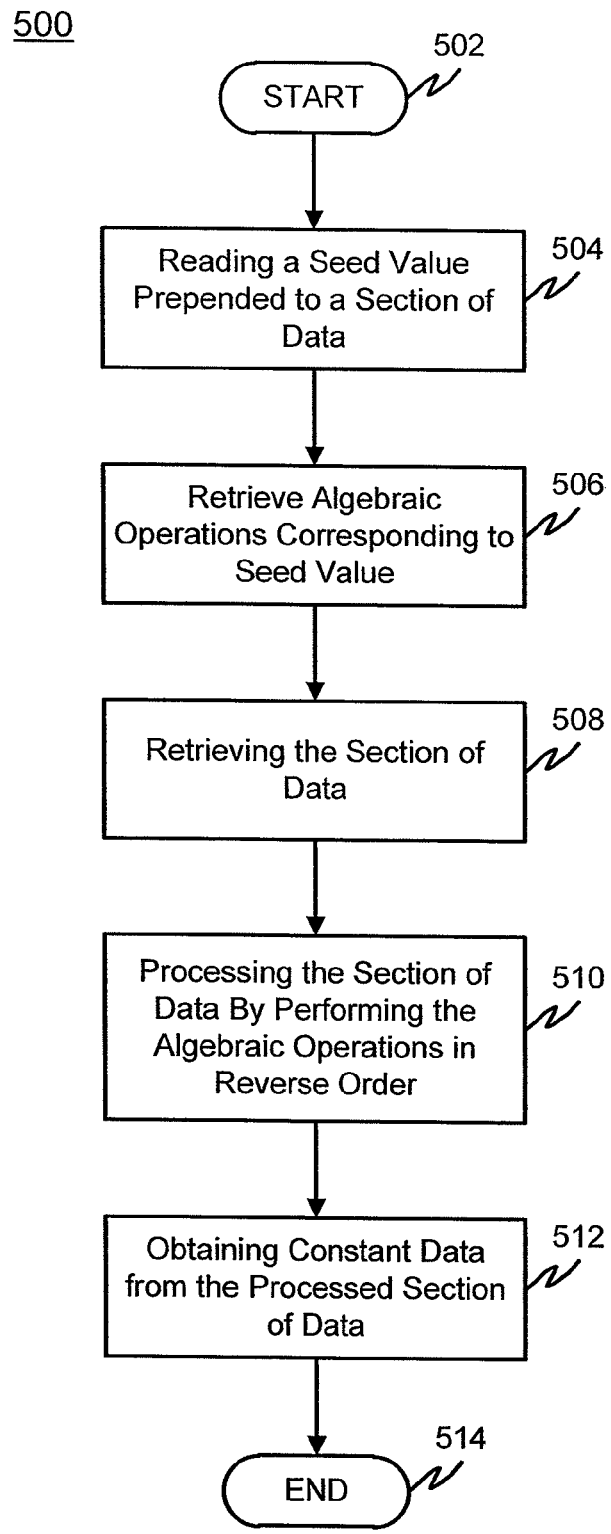
FIG. 5 is a chart of an exemplary data retrieval method in accordance with the present disclosure.

FIG. 5 is a chart of an exemplary data retrieval method 500 in accordance with the present disclosure. Processing begins at 502 and continues to 504.

At 504, a seed value prepended to a section of data is read. For example, a programmable logic device may read (or receive) a seed value prepended to a section of pseudo-random data to be processed as part of a secure data retrieval operation. Processing continues to 506.

At 506, one or more algebraic operations corresponding to the seed value are retrieved. For example, a programmable logic device may retrieve algebraic operations from an internal or external data storage device or may receive the seed value from a different system or device external to the programmable logic device. Processing continues to 508.

At 508, a section of pseudo-random data is retrieved. For example, a programmable logic device may retrieve the section of data from an internal or external data storage device or may receive the section of data from a different system or device external to the programmable logic device. Processing continues to 510.

At 510, the section of data is processed according to the algebraic operations. For example, the programmable logic device may perform the retrieved algebraic operations in a second order (e.g., reverse order) on the section of pseudo-random data received by the programmable logic device, thus transforming the pseudo-random input data into constant data. Processing continues to 512.

At 512, the constant data is provided as output and can be stored in memory. It will be appreciated that the constant data may be transmitted to another system in addition to, or as an alternative to, storing the constant data in memory. Processing continues to 514, where processing ends.

It will be appreciated that 504-512 can be repeated in whole or in part in order to accomplish a contemplated data retrieval operation.

It will be appreciated that the modules, processes, systems, and sections described above can be implemented in hardware, hardware programmed by software, software instructions stored on a nontransitory computer readable medium or a combination of the above. A system for secure data storage and retrieval, for example, can include using a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the data security and programmable logic device arts.

Moreover, embodiments of the disclosed method, system, and computer program product can be implemented in software executed on a programmed general purpose computer, a special purpose computer, a microprocessor, or the like.

It is, therefore, apparent that there is provided, in accordance with the various embodiments disclosed herein, computer systems, methods and computer readable media for secure data storage and retrieval.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

What is claimed is:

1. A method for storing data, the method comprising:
obtaining, at a programmable logic device, a seed value;
retrieving, with the programmable logic device, one or more algebraic operations based on the seed value;
processing, with the programmable logic device, input data according to the one or more algebraic operations to generate pseudorandom output data;
prepending, with the programmable logic device, the seed value to the output data; and
storing the output data in an electronic data storage device coupled to the programmable logic device.

2. The method of claim 1, wherein the programmable logic device is a complex programmable logic device (CPLD).

3. The method of claim 1, wherein the method further comprises performing the one or more algebraic operations on the input data using an arithmetic section of the programmable logic device.

4. The method of claim 2, wherein the algebraic operation are retrieved from an algebraic operations table having stored therein algebraic operations corresponding to seed values.

5. The method of claim 1, wherein the seed value is retrieved from a seed table containing seed values available for use by the programmable logic device.

6. A method for retrieving data, the method comprising:
reading, at a programmable logic device, a seed value appended to a section of data stored in an electronic data storage device coupled to the programmable logic device;
retrieving, with the programmable logic device, one or more algebraic operations based on the seed value;
retrieving, with the programmable logic device, the section of data from the electronic data storage; and
processing, with the programmable logic device, the section of data by performing the one or more algebraic operations in reverse order on the section of data to generate output data.

7. The method of claim 6, wherein the programmable logic device is a complex programmable logic device (CPLD).

8. The method of claim 6, wherein the method further comprises performing the one or more algebraic operations on the section of data using an arithmetic section of the programmable logic device.

9. The method of claim 6, wherein the one or more algebraic operations are retrieved from an algebraic operations table having stored therein algebraic operations corresponding to seed values.

10. The method of claim 6, wherein the seed value is retrieved from a seed table containing seed values available for use by the programmable logic device.

* * * * *